United States Patent Office 3,662,010
Patented May 9, 1972

3,662,010
TRICYCLODECENE DERIVATIVES
Pierre Legendre, Arthez-de-Bearn, France, assignor to Societe Nationale des Petroles d'Aquitaine, Courbevoie, France
No Drawing. Filed Nov. 28, 1969, Ser. No. 880,891
Claims priority, application France, Nov. 28, 1968, 175,735
Int. Cl. C07c *13/78*
U.S. Cl. 260—666 PY    12 Claims

ABSTRACT OF THE DISCLOSURE

The invention relates to the preparation of unsaturated derivatives of tricyclodecene and, more particularly, of $(5,2,1,0^{2.6})$-tricyclo-8-decenes, of which the carbon atom in the 6-position carries an unsaturated hydrocarbon radical, comprising one or more double bonds. The invention is also concerned with these new products.

BACKGROUND OF THE INVENTION

Tricyclodecenes with unsaturated extranuclear groups are useful for the preparation of copolymers with olefins, particularly of terpolymers with ethylene and propylene. A small proportion thereof is sufficient for imparting interesting properties to the copolymer. The applicants have found that derivatives of tricyclo-8-decene, of which the 6-position carries a hydrocarbon group with at least one double bond, are of very great interest for such copolymerization reactions. As a small proportion of tricyclic compound is generally sufficient, it is not absolutely necessary to be able to obtain these tricyclodecenes at very low cost, since their price plays a relatively small part in the price of the copolymer to be obtained. However, it has nevertheless been impossible so far to employ such compounds, because practical processes permitting them to be prepared with an acceptable yield did not exist. These and other difficulties experienced with the prior art devices have been obviated in a novel manner by the present invention.

It is, therefore, an outstanding object of the invention to provide a tricyclodecene derivative which is operative with olefines to obtain useful polymers.

Another object of this invention is the provision of a tricyclodecene derivative for obtaining a trepolymer with ethylene and propylene.

A further object of the present invention is the provision of a process for obtaining a tricyclodecene derivative with commercially acceptable yield.

With the foregoing and other objects in view, which will appear as the description proceeds, the invention resides in the combination and arrangement of steps and the details of the composition hereinafter described and claimed, it being understood that changes in the precise embodiment of the invention herein disclosed may be made within the scope of what is claimed without departing from the spirit of the invention.

SUMMARY OF THE INVENTION

The process according to the invention consists in preparing a tricyclo-8-decene, of which the carbon atom in the 6-position is connected to an extranuclear carbon atom which is a carrier of a double bond, by dehydration of an alcohol of the type

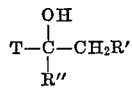

in which T is a $(5,2,1,0^{2.6})$-tricyclo-8-decenyl which is optionally substituted on its nuclei, each of the symbols R′ and R″ designating an alkyl, an alkenyl or a hydrogen atom, the carbon carrier of OH being connected to the carbon in the 6-position of the T nucleus.

DESCRIPTION OF THE PREFERRED EMBODIMENT

One preferred form of the invention consists in causing a compound of the form

in which T indicates the aforementioned radical, R being an alkyl, a hydrogen atom or an electronegative group, particularly a halogen or an alkoxy, to react with a magnesium compound of an alkyl or an alkenyl, in hydrolyzing the reaction product with the magnesium compound, so as to obtain a compound with an alcohol function, and in dehydrating this latter.

The initial compound for this preparation

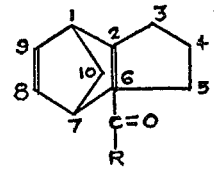

of which the nuclei or rings are represented by T, in the present description, can carry alkyl substitutions particularly with $C_1$ to $C_4$ at the 1, 3, 4, 5, 7 and/or 10-positions.

When R is a hydrocarbon radical, T—CO—R consequently being a ketone, the sequence of the reactions according to the invention can be written:

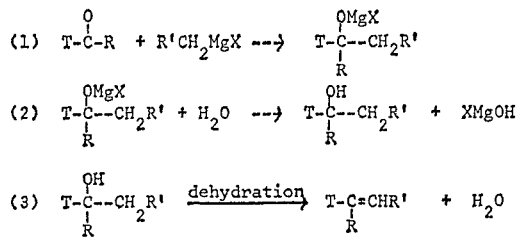

In the magnesium compound which is used, X is a halogen, particularly I, Br or Cl, while R′ is an alkyl or an alkenyl, or even a hydrogen atom. Preferably, when R′ is not H, it contains 1 to 5 carbon atoms, and particularly 1 to 3 carbon atoms.

If R is a hydrogen atom, that is to say, if T—COR is an aldehyde, the final product has the formula

T—CH=CHR′ which becomes T—CH=CH$_2$ when R′ is also a hydrogen atom.

In the case where R is formed by an electronegative group, particularly such as Cl, Br, or —OR‴, R‴ being an alkyl, for example, —C$_2$H$_5$ or a similar compound, two moles of the magnesium compound participate in the reaction (1), and this has the effect of fixing two —CH$_2$R′ groups of the extranuclear carbon of the rings T, as illustrated by the equation:

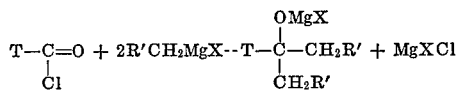

and the final product, after dehydration, has the form

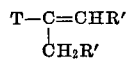

In the particular case where R' is a hydrogen, the compound obtained is

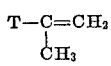

(Formula II, indicated below).

When the initial compound is a ketone T—CO—R, the radical R is usually a $C_1$ to $C_{12}$ alkyl and mainly a lower alkyl.

The preferred operational procedure consists in dissolving the T—CO—R compound in a solvent with a low boiling point, such as particularly ether, and in progressively introducing it into the magnesium compound, in the same solvent or a solvent of the same type. After this introduction, the mixture is kept at the boiling point of the solvent, with reflux of the latter, until the reaction (1) or (1') is terminated. The hydrolysis, that is to say, the decomposition of the magnesium compound according to (2), preferably takes place in crushed ice to which is added a salt, particularly ammonium chloride. From the separated organic phase, to which is added an extract from the solvent of the aqueous phase, there is withdrawn the compound with an alcohol function, the dehydration of which according to (3) is effected by distillation at a temperature between approximately 70° and 120° C. under reduced pressure, preferably in the presence of a dehydrating agent, for example, potassium bisulphate, anhydrous sodium sulphate or other agent.

It is obvious that the magnesium of the compound R'CH$_2$MgX, used in the preparation as described, can optionally be replaced by another of the fairly strong electropositive metals, as for example Li, Zn, etc., capable of giving in known manner reactions which are similar to those of the magnesium compounds.

When the tricyclic group T of Formula I does not carry substitutions other than —CO—R, R being a methyl and R' a hydrogen atom, the unsaturated hydrocarbon formed by the reaction (3) is 6-methylvinyl-(5,2,1,0$^{2.6}$) tricyclo-8-decene (Formula II below): if R' is an ethenyl, that is to say, if R'CH$_2$— is allyl, the hydrocarbon obtained is that of the 6-(2-piperylenyl)-(5,2,1,0$^{2.6}$) tricyclo-8-decene of Formula III:

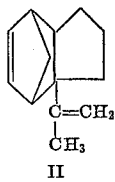 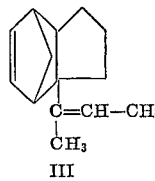
II              III

These two compounds are indicated, in non-limiting manner, as examples of tricyclodecenes according to the invention which can be prepared by the new process.

As regards the ketone T—CO—R, serving as initial material in the preparation of these compounds, it can be obtained by the addition reaction of an acyl cyclopentene with optionally substituted cyclopentadiene, in accordance with:

(4)
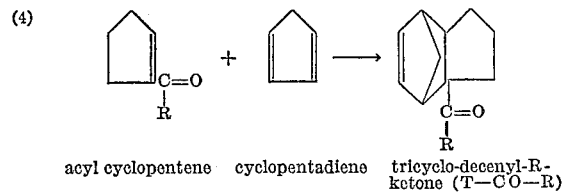
acyl cyclopentene  cyclopentadiene  tricyclo-decenyl-R-ketone (T—CO—R)

This reaction is carried out by prolonged heating of the two reactants in an inert liquid, which is preferably a solvent; the most suitable temperature is between 150° and 200° C. When R is a lower alkyl, dioxane is quite suitable, and the operation lasts about 20 hours in the region of 180° C. The desired ketone is seperated by fractionation under vacuum.

It is to be noted that the yield of T—CO—R ketone, from the reaction (4), relatively to the acyl cyclopentene, is improved if an excess of cyclopentadiene is used; thus, instead of the stoichiometric proportion, it is advisable to use 1.5 to 2.5 or better still, 1.8 to 2 moles of cyclopentadiene per mole of acyl cyclopentene.

The acyl cyclopentene can be obtained by the known method, which consists in treating the cyclopentene with an acyl halide in the presence of stannic chloride, and in then eliminating one mole of hydracid from the formed compound. Thus, the acetyl cyclopentene is obtained by the action of acetyl chloride on cyclopentene, in the presence of SnCl$_4$, followed by dehydrochlorination.

The invention is illustrated by the following non-limiting examples:

EXAMPLE 1

Preparation of 6-methylvinyl-(5,2,1,0$^{2.6}$)-tricyclo-8 decene (Formula II as above)

First of all, magnesium-methyl iodide is prepared from 37 g. of Mg, 100 ml. of methyl iodide in 500 ml. of ether; to the magnesium compound thus formed is added dropwise a solution of 44 g. of ketone T—CO—CH$_3$ (Formula I) in 90 ml. of ether.

Once this addition is completed, the mixture is gently heated with reflux of the ether for 2 hours.

The magnesium compound is then hydrolyzed by means of a mixture of ice with NH$_4$Cl. The ethereal phase is decanted, while the aqueous phase is subjected to an extraction with ether, and the extract is added to the first ethereal phase. The total solution in the ether is then dried over anhydrous sodium sulphate after which the ether is evaporated.

There then remains a residue of 43 g. of partially dehydrated crude alcohol

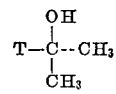

which is subjected to complete dehydration by distillation at 200° C./500 mm. Hg, in the presence of 20 g. of KHSO$_4$.

The products from this distillation are fractionated in a Haage column, which leads to 6 g. of hydrocarbon

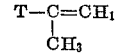

(Formula II) being obtained, this being characterized by a boiling point of 103° C./17 mm. Hg and by the refractive by a boiling point 103° C.17/mm. Hg and by the refractive index $n_D^{25}=1.504$.

The yield relatively to the ketone which is used is 13.5%.

EXAMPLE 2

Preparation of 6-(2-piperylenyl)-(5,2,1,0$^{2.6}$) tricyclo-8-decene (Formula III)

The operating procedure is the same as in Example 1, but the magnesium compound is formed from 7.5 g. of Mg and 24 g. of allyl chloride in 200 ml. of ether. 25 g. of the same ketone T—CO—CH$_3$ as in the previous example, dissolved in 50 ml. of ether, is gradually added thereto. After refluxing for 2 hours, hydrolysis as indicated above and separation, there are collected 25 g. of alcohol

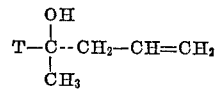

which is subjected to dehydration by distillation at 90° C./1 mm. Hg with 7 g. of KHSO$_4$.

The 20 g. of product obtained in this way are subjected to fractionation by means of the Haage rotating band column, which gives 4.9 g. of hydrocarbon

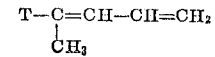

of Formula III.

This product has a boiling point of 127–130° C./10 mm. Hg and a refractive index $n_D^{20°}=1.5237$. In the infra-red spectrum, the line 1640 cm.$^{-1}$ of C=C is found. The yield, based on the ketone, is 17.3%.

EXAMPLE 3

Preparation of (5,2,1,0$^{2.6}$)tricyclo-8-decenyl-6-methylketone, T—CO—CH$_3$ (Formula I)

50 g. of acetyl cyclopentene (0.455 mole), with 30 g. of cyclopentadiene (0.455 mole) and 100 g. of dioxane are hermetically sealed in a steel tube with a capacity of 250 ml. The tube is heated at 180° C. for 20 hours.

By fractionated distillation of the product of the reaction, there is firstly eliminated the solvent (dioxane) and the uncombined acetyl cyclopentene, and secondly heavier products such as the ketone T—CO—CH$_3$ and this latter is particularly obtained in the fractions passing over between 90° and 115° C./0.5 mm. Hg.

The separated ketone, with a yield of 20.6% relatively to the acetyl cyclopentene, although still containing traces of this latter compound and heavy products, is very well suitable for the synthesis according to Examples 1 and 2.

Its refractive index $n_D^{20}$ is 1.5175.

EXAMPLE 4

Copolymerization of the tricyclo compound of Example 1 with ethylene and propylene The copolymerization is carried out in a cylindrical vessel having 10 cm. in diameter and a capacity of 1 litre, and provided with a stirrer and with gas inlet and outlet tubes. The vessel is immersed in a thermostatic bath kept at 0° C. The gas inlet pipe reaches the bottom of the vessel and is terminated by an annular distributor having 8 cm. in diameter. The inner space of the vessel is purged by blowing a stream of nitrogen, and while nitrogen is continuing to pass 700 ml. of anhydrous n-heptane and 2 grams of 6-methyl-vinyl-tricyclo (5,2,1,$^{2.6}$)-8-decene (Formula II) are introduced therein. Then, through the gas inlet pipe first nitrogen is again introduced; subsequently a mixture of 2 volumes propylene wth 1 volume ethylene is passed during 20 minutes at a rate of 99 litres (standard conditions) per hour.

0.5 millimole of vanadium tetrachloride in 30 ml. of anhydrous n-heptane is kept under nitrogen within a closed funnel connected with the vessel; in a second similar funnel there are 3 millimoles of diethyl-aluminum monochloride Et$_2$AlCl in 30 ml. of anhydrous n-heptane; the content of the two funnels constitutes the catalyst for the copolymerization.

The above mixture of propylene and ethylene is made to pass continuously through the liquid within the vessel, at the rate of 99 litres/hour; simultaneously the two catalyst components are poured into dropwise during 30 minutes. Passing the above mixture is still continued for 10 minutes. After the total period of 40 minutes, the reaction which occurred is stopped by adding 20 ml. of isopropanol containing 0.2 gram of anti-oxidant "Wing-Stay T."

The polymer formed is purified, coagulated in isopropanol, and dried: there are thus obtained 23 grams of solid product having the appearance of a non-vulcanized elastomer, which reveals amorphous when tested with X-rays. It is a terpolymer having 40% by weight of ethylene and 5.5% diene, and its molecular weight is about 158,000.

Vulcanization 100 parts by weight of the above copolymer are mixed on a roll mixer with 50 parts of carbon black HAF, 5 parts of zinc oxide, 2 parts of sulfur, 1 part of mercaptobenzothiazole and 2 parts of tetramethylthiurame disulfide. The mixture obtained is heated at 160° C. in a press for one hour.

EXAMPLE 5

Copolymerization similar to that of Example 1 was carried out with methyl-butadienyl-6 tricyclo (5,2,1,0$^{2.6}$)-8-decene (Formula III); the catalyst comprises 1.25 millimoles vanadium tetrachloride and 7.5 millimoles diethylaluminum monochloride, and it is introduced during 50 minutes, the total duration of reaction being 70 minutes. 12 grams of amorphous elastomer are obtained, which has a molecular weight of 119,000 and a 50% by weight content of ethylene.

MECHANICAL PROPERTIES OF VULCANIZED COPOLYMERS

| Example | 4 | 5 |
|---|---|---|
| Tensile strength, kg./cm.$^2$ | 230 | 240 |
| Elongation, percent at break | 440 | 350 |
| Elasticity modulus at 300% elongation, kg./cm.$^2$ | 144 | 200 |
| Shore A hardness | 78 | 75 |
| Rebound, percent | 56 | 62 |

While it will be apparent that the illustrated embodiments of the invention herein disclosed are well calculated adequately to fulfill the objects and advantages primarily stated, it is to be understood that the invention is susceptible to variation, modification, and change within the spirit and scope of the subjoined claims.

The invention having been thus described, what is claimed as new and desired to secure by Letters Patent is:

1. A process for the preparation of (5,2,1,0$^{2.6}$)-tricyclo-8-decenes, of which the carbon atom in the 6-position carries an unsaturated hydrocarbon radical, which consists in dehydrating an alcohol of the type

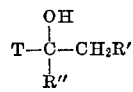

in which T is an optionally substituted (5,2,1,0$^{2.6}$)-tricyclo-8-decenyl radical, in which R' and R" are selected from the group consisting of alkyls, alkenyls, and hydrogen atoms, and in which the carbon carrier of OH is connected to the carbon in the 6-position of the nucleus T.

2. A process as recited in claim 1, wherein the dehydration of the alcohol is effected by distillation at about 70° to 120° C.

3. A process as recited in claim 1, wherein the dehydration takes place in the presence of a dehydrating salt.

4. A process as recited in claim 1, wherein the said alcohol originates from the action of a magnesium compound on a compound of the type

in which R is an alkyl, a hydrogen atom or an electronegative group, particularly a halogen or an alkoxy, this action being followed by hydrolysis.

5. A process as recited in claim 4, wherein the magnesium compound is of the form R'CH$_2$MgX, in which R' is a hydrogen atom or even an alkyl or an alkenyl containing 1 to 5 carbon atoms, X being iodine, bromine or chlorine.

6. A process as recited in claim 4, wherein the compound

is a ketone obtained by heating one mole of an acyl cyclopentene with at least one mole of cyclopentadiene.

7. A process as recited in claim 6, wherein the heating takes place between 150 and 200° C., in an inert liquid, after which the formed ketone is separated by fractionation under vacuum.

8. A process as recited in claim 1, wherein the radical T carries one or more alkyl substituents in the 1, 3, 4, 5, 7 and/or 10 positions.

9. A (5,2,1,0$^{2.6}$)-tricyclo-8-decene, characterized in that its carbon atom in the 6-position carries the group

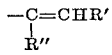

in which R' and R" are selected from the group consisting of alkyls, alkenyls, and hydrogen atoms.

10. A tricyclodecene as recited in claim 9, wherein the radical R' contains 1 to 5 and R" 1 to 12 carbon atoms.

11. A tricyclodecene derivative as recited in claim 10, which is in the form of the 6-methylvinyl-(5,2,1,0$^{2.6}$)-tricyclo-8-decene.

12. A tricyclodecene derivative as recited in claim 10, which is in the form of the 6-(2-piperylenyl)-(5,2,1,0$^{2.6}$)-tricyclo-8-decene.

References Cited
UNITED STATES PATENTS

| | | | |
|---|---|---|---|
| 3,345,419 | 10/1967 | Tinsley | 260—617 |
| 3,373,214 | 3/1968 | Marcus et al. | 260—666 Py |
| 3,455,966 | 7/1969 | Marcus et al. | 260—348 |

FOREIGN PATENTS

| | | | |
|---|---|---|---|
| 1,542,504 | 10/1968 | France | 260—666 Py |

OTHER REFERENCES

Wagner, R. B. and Zook, H. D., Synthetic Organic Chemistry, John Wiley & Sons, 1965, pp. 161–164.

DELBERT E. GANTZ, Primary Examiner

V. O'KEEFE, Assistant Examiner

U.S. Cl. X.R.

260—586, 617